Nov. 11, 1952  K. J. KNUDSEN  2,617,306
ROTATION-TRANSMITTING DEVICE
Filed Sept. 15, 1949
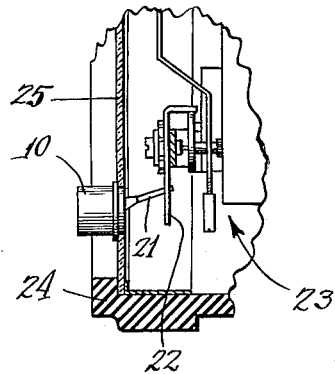
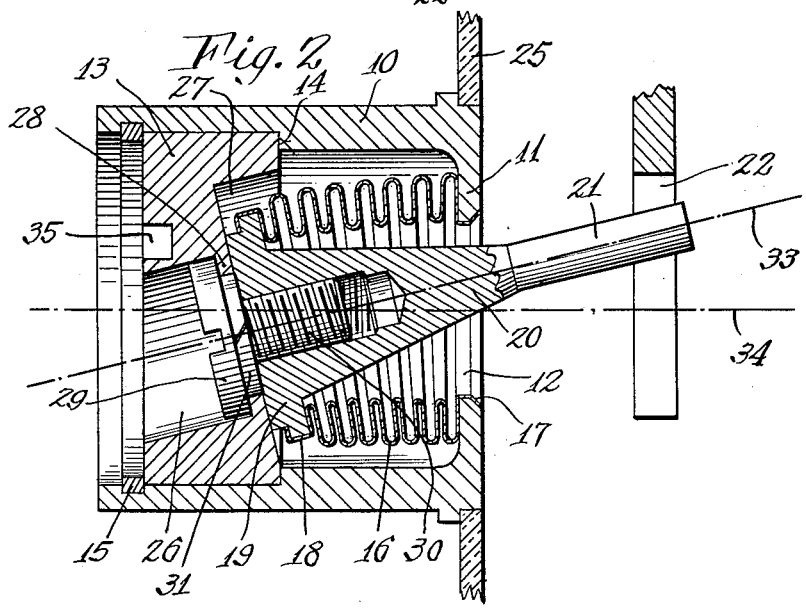
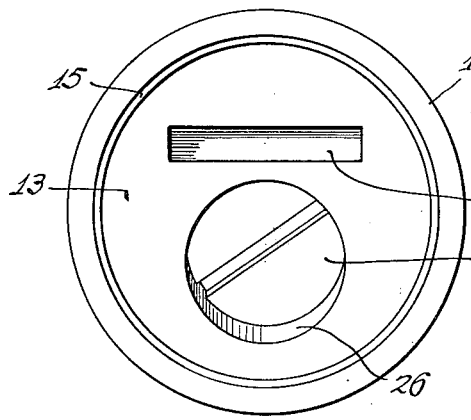
Inventor
Knud J. Knudsen
By Johnson and Kline
Attorneys Patented Nov. 11, 1952

2,617,306

UNITED STATES PATENT OFFICE 2,617,306

ROTATION-TRANSMITTING DEVICE

Knud J. Knudsen, Naugatuck, Conn., assignor to The Lewis Engineering Company, Naugatuck, Conn., a corporation of Connecticut Application September 15, 1949, Serial No. 115,851

5 Claims. (Cl. 74—18.1)

1

This invention relates to sealing-type rotation-transmitting devices, and more particularly to relatively small devices of this class which are adapted for introduction of movement from an external source into a sealed instrument casing without impairing the seal.

Sensitive instrument movements, particularly those used in aircraft, are often housed in sealed casings in order to insure reliability throughout an extended period of use. Many of these instrument movements have zero adjustment means in the form of screws which are brought out through the casing to enable convenient adjustment of the instrument from the exterior.

Heretofore it has been proposed to provide small, sealed-type rotation-transmitting devices on the instrument casings, to enable the zero adjustment to be made from the casing exterior without impairing the seal of the casing. One such device comprises a bellows and a shaft attached to the bellows and extending through it, said shaft being connected to the instrument adjustment fork and being arranged to transmit motion to said fork by virtue of changes in its angularity. In this prior device a free turning connection was employed between the angular shaft and an angular pin eccentrically carried on a turnable member of the device, and this connection permitted relative axial movement between the shaft and pin so that under certain circumstances damage could be done to the bellows, particularly if the shaft were pulled on.

An object of the present invention is to provide an improved sealing-type rotation-transmitting device which is so arranged that the angular shaft of the device is securely mounted and held in its various positions by the rigid structure of the device and prevented from axial movement, thereby to minimize any likelihood of distortion or damage to the bellows.

Another object of the invention is to provide an improved device as characterized above which is simple in construction, easy to assemble and economical to fabricate.

In accomplishing the above objects I provide an improved structure comprising a bellows and a shaft secured to one end of the bellows and extending through it, and comprising a novel turnable member and free-turning connection with the shaft, the said connection being so arranged as to hold the shaft against axial movement with respect to the member, while at the same time being very simple and economical to fabricate. The turnable member is mounted on a housing structure and is confined to purely rotative move-

2 ment, and by this organization all lateral and push-pull stresses which might be imposed on the shaft will be borne by the member and the housing, which are sturdy and rigid and well able to stand such stresses, and not by the bellows. Thus the bellows is reliably protected against deformation or damage during shipment, handling and installation of the device. The only stresses which the bellows are called on to withstand are rotative stresses of the shaft, and these are not commonly met in practice.

The device of this invention is thus sturdy and rugged, and will not easily become damaged or get out of order prior to its installation.

Other features and advantages will hereinafter appear.

In the accompanying drawings:

Figure 1 is a fragmentary vertical sectional view taken through a sensitive instrument movement and a sealed casing, the improved sealing-type operator of this invention being mounted on the casing window for effecting zero adjustment of the instrument.

Fig. 2 is an enlarged axial sectional view taken through the movement-transmitting device of this invention; and Fig. 3 is a front elevational view of the device.

Referring to Figs. 1 and 2 the present improved movement-transmitting device comprises a generally cylindrical casing 10 having an inwardly extending flange 11 at its inner end, constituting an end wall, the said wall thus being characterized by a relatively large central aperture 12.

Within the casing 10 a novel, turnable cylindrical member 13 is mounted, adapted to be manually operated as by means of a screw driver, said member engaging an internal shoulder 14 in the casing and a spring retainer ring 15. The casing 10 and member 13 are thus seen to have cooperable annular bearing portions engaging each other. Also in the casing 10 a sealing bellows 16 is provided, having one end 17 secured and sealed to the end wall 11 of the casing around the aperture 12. The other end 18 of the bellows 16 is fastened to an enlarged end 19 of a shaft 20 which is actuated by the turnable member 13 in a manner to be shortly described. The shaft 20 extends through the bellows 16 and has a reduced shank 21 projecting beyond the rear wall 11 of the housing 10, said shank being adapted to engage the adjustment fork 22 of a sensitive instrument movement 23, Fig. 1, which is carried in a sealed casing 24. The casing 24 is shown as having a window 25 on which the casing 10 of the movement-transmitting device is mounted.

Referring to Fig. 2, the turnable member 13 has an eccentrically located recess 26 in its front face, the said recess extending into the member at an angle and meeting with an angularly-disposed recess 27 in the rear face of the member. Both the recesses 26 and 27 are generally cylindrical, and are aligned with each other so as to have a common axis. An internal cylindrical flange 28 is provided between the recesses 26 and 27, adapted to be engaged by the head 29 of a screw 30 which is threaded into the enlarged end portion 19 of the shaft 20. A lock washer 31 is carried under the head 29 of the screw 30 to provide a separation between said head and the end face of the portion 19 of the shaft, thereby to provide a loose, free-turning fit between the screw 30 and shaft 20 on the one hand, and the turnable member or part 13 on the other hand.

Thus, by the above organization, a novel rotatable connection is established between the shaft 20 and the member 13, said connection preventing axial movement of the shaft and providing for solely relative rotative movement of the shaft about its axis, indicated at 33, which is always angularly disposed with respect to the fixed axis 34 of the member 13. Actually no rotation of the shaft 20 occurs, due to the bellows 16 tying the shaft to the inner wall 11 of the casing 10, which latter is fixed.

It will be noted that, by virtue of the member 13 being cylindrical and rotatable in the cylindrical casing 10, both these parts have cooperable annular bearing portions with a common axis 34. Also, the screw head 29 being cylindrical, together with the washer 31, and the recesses 26 and 27 and flange 28 being cylindrical, cooperable annular bearing portions are seen to exist on the screw and in said recesses, having the common axis 33.

In the operation of the device, any turning movement of the member 13 will change the angularity of the shaft 20, and will cause the axis 33 of the shaft to follow two conical paths having axes which coincide with the axis 34 of the member 13. The apexes of the said conical paths, of course, meet at a common point which lies in the axis 34. Thus rotation of the member 13 will cause a change in the positioning of the shaft 20 which results in adjustment of the fork 22 of the instrument movement in one direction or the other.

To enable the member 13 to be readily rotated a screw driver slot 35 is provided in its outer face, see Figs. 2 and 3.

It is pointed out that any blows or pressure which might be directed against the shank portion 21 of the shaft 20 laterally of the shaft will be borne by the screw 30 and the member 13, together with the casing 10, and this is true for pulls or pushes to which the shaft 20 is subjected. The bellows 16 will not be called on to withstand any such pressures, and therefore there is minimized the likelihood of deformation or damage to the said bellows. The only forces which the bellows is required to withstand are the rotative forces applied to the shaft 20, and these are commonly not encountered during the shipping, handling or installation of the device.

The structure by which I accomplish the above is simple, has few parts, and may be easily and quickly fabricated and assembled whereby its manufacturing cost is desirably low.

Variations and modifications may be made within the scope of the claims and portions of the improvements may be used without others.

I claim:

1. In a sealed rotation-transmitting device having: an apertured member, a bellows secured end-on to said member around the aperture thereof, a shaft secured to the other end of the bellows and extending through the bellows, and a turnable part mounted adjacent said other end of the bellows and rotatable about a fixed axis with respect to said apertured member, the improvement which comprises: coengaging shoulders on said shaft and turnable part; and connection means between the end portion of the shaft and the turnable part, providing a loose, free-turning connection between said shaft and turnable part, said connection means including means cooperable with said shoulders, maintaining the axes of the shaft and part out of parallelism and holding said part and shaft against relative movement axially of said connection.

2. In a sealed rotation-transmitting device having: an apertured member, a bellows secured end-on to said member around the aperture thereof, a shaft secured to the other end of the bellows and extending through the bellows, and a turnable part located adjacent said other end of the bellows and mounted on said apertured member for solely rotative movement about a fixed axis, the improvement which comprises: connection means between the end portion of the shaft and the turnable part, providing a loose, free-turning connection between said shaft and turnable part, said connection means including means cooperable with said shoulders, maintaining the axes of the shaft and part out of parallelism and holding said part and shaft against relative movement axially of said connection, thereby to hold the shaft against axial movement with respect to the apertured member and prevent permanent deformation of said bellows.

3. A sealed, rotation-transmitting device comprising a tubular casing; a bellows within the casing, one end each of said casing and bellows being secured and sealed to each other; a turnable member rotatably mounted on and wholly within the casing adjacent the other ends of the bellows and casing, said member having a recess in its inner end; means holding said member against axial movement; a shaft passing through the bellows, secured and sealed to said other end of the bellows; coengaging shoulders on said shaft and turnable member, located within the recess of the latter; and connection means between the end portion of the shaft and the turnable member, rotatably connecting the shaft to said member for turning movement of the shaft solely about an axis non-parallel with the axis of the member, said connection means including means holding the shaft against movement along its axis.

4. A sealed, rotation-transmitting device comprising a tubular casing; a bellows within the casing, one end each of said casing and bellows being secured and sealed to each other; a turnable member rotatably mounted in the casing adjacent the other ends of the bellows and casing, said member having an eccentrically located aperture and an annular bearing portion surrounding said aperture, the axis of said bearing portion being angularly disposed to the axis of the member; a shaft passing through the bellows, secured and sealed to said other end of the bellows; and means for rotatably connecting the shaft to said member for turning movement about an axis non-coincidental with the axis of the member, said means holding the shaft against movement along its axis, and including a screw threaded into the shaft and passing through the aperture of said turnable member, said screw having a bearing relationship to said annular bearing portion.

5. A sealed, rotation-transmitting device comprising a tubular casing; a bellows within the casing, one end each of said casing and bellows being secured and sealed to each other; a turnable cylindrical member rotatably mounted in the casing adjacent the other ends of the bellows and casing, said member having aligned recesses in its ends, and having an eccentrically located aperture joining said recesses, the bottom walls of the recesses constituting annular bearing portions surrounding said aperture and the axis of said bearing portions being angularly disposed to the axis of the member; a shaft passing through the bellows, secured and sealed to said other end of the bellows; and means for rotatably connecting the shaft to said member for turning movement about an axis non-coincidental with the axis of the member, said means holding the shaft against movement along its axis, and including a screw threaded into the shaft and passing through the aperture of said turnable member, said screw having a bearing relationship to one of said annular bearing portions.

KNUD J. KNUDSEN.

REFERENCES CITED

The following references are of record in the file of this patent:

UNITED STATES PATENTS

| Number | Name | Date |
| --- | --- | --- |
| 2,395,843 | Brown | Mar. 5, 1946 |
| 2,417,546 | De Giers | Mar. 18, 1947 |
| 2,419,074 | Herbert, Jr. | Apr. 15, 1947 |
| 2,454,340 | Reichel | Nov. 23, 1948 |
| 2,497,867 | Cymmer | Feb. 21, 1950 |
| 2,513,184 | Lamb | June 27, 1950 |
| 2,548,555 | Noxon | Apr. 10, 1951 |

FOREIGN PATENTS

| Number | Country | Date |
| --- | --- | --- |
| 949,949 | France | Sept. 13, 1949 |